2,900,260

METHOD OF PRESERVING THE RED COLOR OF RED MEAT AND PRODUCT

James E. Snyder, Akron, and George W. Ferner, Cuyahoga Falls, Ohio, assignors to The Goodyear Tire & Rubber Company, Akron, Ohio, a corporation of Ohio No Drawing. Application January 30, 1956
Serial No. 561,981

8 Claims. (Cl. 99—174)

This invention relates to transparent rubber hydrochloride film to which a high oxygen diffusion rate has been imparted by plasticization. This film is designed especially for packaging freshly cut red meats, and particularly for packaging such meats for sale in self-service stores where the meats must retain their red color for at least twenty-four hours, and preferably over a week end. The invention includes the film and red meats packaged in the film.

The term "red meats" as used herein means, more particularly, roasts and steaks and the like of fresh beef, mutton, veal, game, and pork. The film may also be used for packaging other meats, as fresh poultry, fish, seafood, etc., and in the packaging of fresh fruits and vegetables, where relatively high gas permeation through the film wrapper is important.

The highly plasticized films of this invention are also well suited for wrapping large objects such as hams where tight wraps effected by slight stretching are desirable. The films are also suitable for packaging frozen products such as fish, seafoods, poultry, etc., where superior strength at freezer temperatures is required.

The color changes of fresh red meats are mainly those of products of myoglobin. Oxymyoglobin and metmyoglobin are both obtainable from reduced myoglobin, the former by oxygenation and the latter by oxidation. The conversion of reduced myoglobin to oxymyoglobin is a process of oxygenation and the iron present is not oxidized during the process, but remains as ferrous iron in the oxymyoglobin which is produced. Oxymyoglobin changes to reduced myoglobin and thence to metmyoglobin when oxygen is deficient.

Reduced myoglobin makes the meat which contains it dark red or purple in color due to its content of ferrous iron. This is the color of freshly cut meat. If a fresh cut of this color is exposed to air, the dark red myoglobin takes up oxygen from the air and forms bright red oxymyoglobin. Both the dark red and the bright red are attractive and both contain ferrous iron.

Metmyoglobin is an oxidation product. Its iron content is present as ferric iron. It is the conversion of the ferrous iron to ferric iron that causes meat to discolor. This occurs simultaneously with the oxidation of reduced myoglobin to metmyoglobin.

Exposure of freshly cut red meat to the atmosphere or to oxygen tends to produce oxymyoglobin from reduced myoglobin. A wrapper that excludes much of the oxygen of the air hastens the production of metmyoglobin and causes the meat to discolor. On the other hand, a wrapper which is of such a composition and thickness as to permit ample diffusion of oxygen into the package, keeping an excess present, causes oxymyoglobin to form and prevents or retards the formation of metmyoglobin. At the same time, a satisfactory red-meat wrapper must prevent any substantial loss of moisture from the meat.

For meat packaging, heat-sealable hydrophobic film of uniform composition throughout, such as rubber hydrochloride film, has proven desirable because it does not shrink nor wrinkle from moisture sorption and the heat-sealed closure is not weakened by contact with meat juices. Also, it is an efficient water-vapor barrier. It is not only resistant to water, but also to grease. The unplasticized film is relatively impervious to the passage of oxygen. It is made more pervious by plasticizing, and films containing 25 to 40 parts by weight of liquid plasticizer, preferably ester plasticizer, for each 100 parts of the rubber hydrochloride, are recommended. Rubber hydrochloride films ranging from 0.0003 to 0.0012 inch in thickness and plasticized according to the invention have proven quite satisfactory. The thinner films require the smaller proportion of plasticizer.

Rubber hydrochloride films which contain as much as 25 to 40 parts of a single plasticizer may exude some of the plasticizer under certain conditions. Mixtures of plasticizers are better retained in the film and usually are preferred. The high plasticizer content improves film durability at low temperatures. The films of this invention are, therefore, particularly adapted for packaging red meats, etc., where low-temperature durability and high-oxygen permeability and relatively low moisture vapor permeability are required.

After extensive investigation it has been found that the butyl "Carbitol" esters of saturated higher monobasic aliphatic acids, $RCOO.CH_2CH_2.O.CH_2CH_2.OC_4H_9$, and the butyl "Cellosolve" esters of higher monobasic aliphatic acids, $RCOO.CH_2CH_2.OC_4H_9$, are superior plasticizers for use in rubber hydrochloride film to be used for packaging meats. In the foregoing formulae R is an aliphatic radical which contains 6 to 17 carbon atoms. Butyl "Carbitol" is a trade-name for diethylene glycol monobutyl ether. Butyl "Cellosolve" is a trade-name for ethylene glycol monobutyl ether. The best materials for plasticizing rubber hydrochloride film for packaging red meats are butyl "Carbitol" pelargonate, butyl "Cellosolve" laurate, and butyl "Cellosolve" epoxystearate.

It is desirable that the plasticizers be of low volatility so as to permanent rather than fugitive. They should have a boiling point above about 230° C. Lower boiling plasticizers may be used, however, if measures are taken to prevent loss of plasticizer from the film prior to its use as a wrap. Furthermore, the plasticizers should not freeze out or solidify in the film when the meat is subjected to refrigeration temperatures. Accordingly, the freezing point of the plasticizers should be below zero. If the film is to be used on frozen foods, plasticizer of even lower freezing point is required. The superior plasticizers for rubber hydrochloride films used for wrapping red meat are, therefore, butyl "Carbitol" and butyl "Cellosolve" esters of monobasic saturated aliphatic acids which have generally some 7 to 18 carbon atoms and a freezing point below 0° centigrade.

The importance of a low freezing point is demonstrated by the fact that butyl "Cellosolve" stearate, while good in permitting the required oxygen permeation is not desirable because film containing the necessary large amount of that plasticizer becomes cloudy at refrigeration temperatures. On the other hand, butyl "Cellosolve" epoxystearate is quite satisfactory since it does not cause cloudiness in the wrap at the lower temperatures.

In addition to the foregoing plasticizers, others which may be employed, according to this invention, include: butyl "Cellosolve" pelargonate, butyl "Carbitol" laurate, and the other butyl "Carbitol" and "Cellosolve" esters of monobasic saturated aliphatic acids containing about 7 to 18 carbon atoms in the acid radical. The corresponding esters of unsaturated fatty acids, such as oleic acid, are undesirable due to the rancidifiable nature of such esters resulting in malodorous products.

The methyl "Cellosolve" esters of the monobasic aliphatic acids, or any acids in fact, are not suitable due to the possible toxic effects of the methoxy groups.

In tests for evaluating plasticizers in rubber hydrochloride for packaging red meat, freshly ground beef has been found to be ideal. Two types are used: ground "frozen" beef containing some fat; and ground fresh lean beef of stewing quality. The former is received in frozen condition, and either before or after grinding it is thawed, so that it is thawed when packaged for testing.

Effectiveness of a plasticizer in transmitting oxygen from the atmosphere through a rubber hydrochloride film to maintain desirable fresh red meat color is judged by visually comparing the film containing the plasticizer with a control wrapper on the ground beef after, for example, 4, 20, and 24 hours of refrigeration. The control is a film presently acceptable as a commercial wrapper for fresh meat. Effectiveness is rated at 0.1 intervals on a scale above (plus) and below (minus) zero. On the scale zero is the rating given the control. Any plasticized film with a plus rating shows better red meat color protection than that of the control. Plus ratings averaging above +0.2 show outstanding effectiveness. Minus ratings show the plasticizer is poorer than that of the control and, therefore, unsatisfactory.

Tables 1, 2, and 3 show the average ratings of rubber hydrochloride films containing butyl "Cellosolve" laurate, butyl "Cellosolve" epoxystearate, and butyl "Carbitol" pelargonate compared with the films containing other plasticizers, including certain common plasticizers and other alkoxy esters.

TABLE 1

[Film base: 100 parts rubber hydrochloride; 30 parts plasticizer.]

| Plasticizer | Color Rating— Ground Beef | |
|---|---|---|
| | Frozen | Fresh Lean |
| butyl "Cellosolve" laurate | +.34 | +.46 |
| butyl "Cellosolve" oleate | +.18 | +.22 |
| butyl "Cellosolve" stearate | +.10 | +.25 |
| butyl "Cellosolve" pelargonate | +.10 | +.21 |
| butyl "Cellosolve" epoxystearate | +.60 | +.30 |
| butyl "Cellosolve" phthalate | +.10 | −.20 |
| butyl "Cellosolve" phosphate | −.10 | −.30 |
| butyl "Carbitol" pelargonate | +.27 | +.26 |
| butyl "Carbitol" laurate | +.10 | |
| "Cellosolve" phthalate | −.60 | −.50 |
| methyl "Cellosolve" phthalate | −.30 | −.40 |
| methyl "Cellosolve" acetyl ricinoleate | −.20 | +.10 |
| dipropylene glycol methyl ether pelargonate | +.10 | +.20 |
| tripropylene glycol methyl ether pelargonate | −.20 | +.10 |

TABLE 2

[Film base: 100 parts rubber hydrochloride; 15 parts dibutyl phthalate; 15 parts other plasticizer.]

| Other Plasticizer | Color Rating— Ground Beef | |
|---|---|---|
| | Frozen | Fresh Lean |
| butyl "Cellosolve" laurate | +.50 | +.50 |
| butyl "Cellosolve" oleate | +.10 | 0 |
| butyl "Cellosolve" phthalate | +.20 | −.10 |
| butyl "Cellosolve" stearate | +.10 | +.30 |
| butyl "Cellosolve" epoxystearate | +.20 | +.20 |
| methyl "Cellosolve" oleate | +.20 | +.30 |
| butyl "Carbitol" pelargonate | +.50 | |
| butyl "Carbitol" laurate | +.10 | |
| 2-ethylhexyl diphenyl phosphate | 0 | 0 |
| butyl stearate | 0 | 0 |

TABLE 3

[Film base: 100 parts rubber hydrochloride; 15 parts 2-ethylhexyl diphenyl phosphate; 15 parts other plasticizer.]

| Other Plasticizer | Color Rating— Ground Beef | |
|---|---|---|
| | Frozen | Fresh Lean |
| butyl "Cellosolve" laurate | +.60 | +.50 |
| butyl "Cellosolve" oleate | −.10 | +.10 |
| butyl "Cellosolve" phthalate | −.20 | −.10 |
| butyl "Cellosolve" stearate | +.05 | +.20 |
| butyl "Cellosolve" epoxystearate | +.40 | +.20 |
| methyl "Cellosolve" oleate | +.30 | +.30 |
| butyl (methyl "Cellosolve") phthalate | −.30 | −.30 |
| methyl "Cellosolve" stearate | −.30 | 0 |
| butyl "Carbitol" pelargonate | +.35 | |
| butyl "Carbitol" laurate | +.10 | |
| dibutyl phthalate | 0 | 0 |

The above tests show that butyl "Cellosolve" laurate is by far the best. Butyl "Cellosolve" epoxystearate and butyl "Carbitol" pelargonate are also superior.

Butyl "Cellosolve" phosphate and butyl "Cellosolve" phthalate apparently do not permit enough oxygen to permeate the rubber hydrochloride film to maintain the red meat color.

There follow certain formulae for film that might be used commercially:

*Formula 1*

100 parts rubber hydrochloride
15 parts 2-ethylhexyl diphenyl phosphate
15 parts butyl "Cellosolve" laurate
1.5 parts Santocel (finely ground silica)
1.5 parts "Carbowax" 1500 dilaurate The Santocel is an anti-blocking agent, i.e., it prevents stacked films from adhering to one another. The "Carbowax" 1500 dilaurate is a hydrophilic agent which prevents fogging of the film from moisture condensation. "Carbowax" is a trade name for polyethylene glycol, 1500 being a blend with molecular weight between 500–600. Other antiblocking agents and other hydrophilic agents may be employed as are well known in the art.

Fifteen parts of butyl "Cellosolve" epoxystearate or fifteen parts of butyl "Carbitol" pelargonate may be substituted for the fifteen parts of butyl "Cellosolve" laurate in the foregoing formula with satisfactory results.

*Formula 2*

100 parts rubber hydrochloride
12 parts butyl "Cellosolve" laurate
9 parts dibutyl phthalate
9 parts 2-ethylhexyl diphenyl phosphate
1.5 parts Santocel
1.5 parts "Carbowax" 1500 dilaurate

*Formula 3*

100 parts rubber hydrochloride
15 parts butyl "Cellosolve" laurate
15 parts butyl "Carbitol" pelargonate
1.5 parts Santocel
1.5 parts "Carbowax" 1500 dilaurate Fifteen parts of butyl "Cellosolve" epoxystearate may be substituted for butyl "Carbitol" pelargonate in the foregoing formula.

*Formula 4*

100 parts rubber hydrochloride
25 to 40 parts butyl "Cellosolve" laurate
1.5 parts Santocel
1.5 parts "Carbowax" 150 dilaurate

Formula 5

100 parts rubber hydrochloride
12 parts butyl "Cellosolve" laurate
18 to 28 parts other liquid plasticizer compatible with rubber hydrochloride
1.5 parts Santocel
1.5 parts "Carbowax" 1500 dilaurate Butyl "Cellosolve" laurate, butyl "Cellosolve" epoxystearate and butyl "Carbitol" pelargonate are interchangeable in the foregoing formulae.

Ordinarily not more than 30 parts of the preferred esters will be used, although 40 parts are usable particularly if slight haziness from exudation of plasticizer under the conditions of use is not objectionable. Where more than 30 parts of plasticizer are used it will ordinarily be desirable to use a mixture of plasticizers, as illustrated by the formulae.

Oxygen absorption tests were run at different temperatures on film samples cut from wraps which had been in contact with hamburger which was held at 35° F. for a substantial period prior to testing. Two of the test films were rubber hydrochloride films, each 0.0008 inch thick, only one of which came within the invention. The third film was a grade of cellophane used commercially in wrapping red meats. In the following table, the oxygen permeability at each temperature is reported in cubic centimeters/100 hours/100 square inches at 1.1 atmosphere oxygen pressure on one side and 1.0 atmosphere oxygen pressure on the other side. The oxygen was saturated with moisture vapor on both sides of the test films.

|  | Oxygen Permeability | |
| --- | --- | --- |
|  | 80° F. | 35° F. |
| Film #1 | 265 | 53 |
| Film #2 | 579 | 211 |
| Film #3 | 322 | 113 |

FILM COMPOSITIONS

Film #1:
 100 parts rubber hydrochloride
 15 parts dibutyl phthalate
 15 parts 2-ethylhexyl diphenyl phosphate
 1.5 parts Santocel
 1.5 parts "Carbowax" 1500 dilaurate Film #2:
 100 parts rubber hydrochloride
 30 parts butyl "Cellosolve" laurate
 1.5 parts Santocel
 1.5 parts "Carbowax" 1500 dilaurate Film #3: Cellophane wrap The greater oxygen permeability of the film of this invention is clearly evident.

The films of this invention are ordinarily 0.0003 to 0.00120 inch thick. The thicker films are cast. The thinner films may be made by stretching cast films of greater thickness. Several thicknesses of the thin films may be used. The films will ordinarily be tightly wrapped around the meat and the wrap will be heat-sealed in the conventional manner.

It is to be understood that the invention is limited to rubber hydrochloride films in which the plasticizer is liquid at refrigerator temperatures. Solid plasticizers such as nitrile rubber are not employed and are objectionable in this type of film because they impart haziness to the film and the film becomes cloudy when in contact with moist products. Antioxidants in the film have occasionally been found to prolong the period during which the film keeps the meat red, and those acceptable for use in food products may be added. All additives to the film must be non-toxic and they must be odorless.

The films of this invention contain 25 to 40 parts by weight of liquid plasticizer for each 100 parts of rubber hydrochloride, and of this total plasticizer content there is at least 12 parts by weight of "Carbitol" or "Cellosolve" ester, as described.

The invention is defined in the claims.

What we claim is:

1. The method of preserving the red color of red meat which comprises packaging red meat in rubber hydrochloride film which contains 25 to 40 parts of liquid plasticizer per 100 parts of rubber hydrochloride the plasticizer being of the class consisting of butoxyethyl laurate, butoxyethyl epoxystearate and butoxyethoxyethyl pelargonate, said film being substantially 0.0003 to 0.0012 inch thick.

2. The method of preserving the red color of red meat which comprises packaging red meat in rubber hydrochloride film which contains 25 to 40 parts of liquid plasticizer per 100 parts of rubber hydrochloride, including at least 12 parts of butoxyethyl laurate, said film being substantially 0.0003 to 0.0012 inch thick.

3. The method of preserving the red color of red meat which comprises packaging red meat in rubber hydrochloride film which contains 25 to 40 parts of liquid plasticizer per 100 parts of rubber hydrochloride, including at least 12 parts of butoxyethyl epoxystearate, said film being substantially 0.0003 to 0.0012 inch thick.

4. The method of preserving the red color of red meat which comprises packaging red meat in rubber hydrochloride film which contains 25 to 40 parts of liquid plasticizer per 100 parts of rubber hydrochloride, including at least 12 parts of butoxyethoxyethyl pelargonate, said film being substantially 0.0003 to 0.0012 inch thick.

5. Freshly cut red meat wrapped in film substantially 0.0003 to 0.0012 inch thick composed essentially of 100 parts by weight of rubber hydrochloride and 25 to 40 parts of liquid plasticizer of the class consisting of butoxyethyl laurate, butoxyethyl epoxystearate and butoxyethoxyethyl pelargonate whereby the oxygen permeability of the film is increased so as to preserve the red color of the meat.

6. Freshly cut red meat wrapped in film substantially 0.0003 to 0.0012 inch thick composed essentially of 100 parts by weight of rubber hydrochloride and 25 to 40 parts of liquid plasticizer, including at least 12 parts of butoxyethyl laurate whereby the oxygen permeability of the film is increased so as to preserve the red color of the meat.

7. Freshly cut red meat wrapped in film substantially 0.0003 to 0.0012 inch thick composed essentially of 100 parts by weight of rubber hydrochloride and 25 to 40 parts of liquid plasticizer, including at least 12 parts of butoxyethyl epoxystearate whereby the oxygen permeability of the film is increased so as to preserve the red color of the meat.

8. Freshly cut red meat wrapped in film substantially 0.0003 to 0.0012 inch thick composed essentially of 100 parts by weight of rubber hydrochloride and 25 to 40 parts of liquid plasticizer, including at least 12 parts of butoxyethoxyethyl pelargonate, whereby the oxygen permeability of the film is increased so as to preserve the red color of the meat.

References Cited in the file of this patent

UNITED STATES PATENTS

| | | |
| --- | --- | --- |
| 2,250,232 | North | July 22, 1941 |
| 2,461,963 | Cheyney | Feb. 15, 1949 |
| 2,633,456 | Vaughan | Mar. 31, 1953 |
| 2,772,172 | Carson | Nov. 27, 1956 |